United States Patent
Espinosa, Jr. et al.

(10) Patent No.: US 12,541,184 B2
(45) Date of Patent: Feb. 3, 2026

(54) OPTIMIZING ENERGY EFFICIENCY ASSOCIATED WITH WORKSPACES IN A BUILDING

(71) Applicant: Zoom Video Communications, Inc., San Jose, CA (US)

(72) Inventors: Jose Luis Espinosa, Jr., Chattanooga, TN (US); Thanh Le Nguyen, Belle Chasse, LA (US); Andrew James Ruhland, Memphis, TN (US)

(73) Assignee: Zoom Communications, Inc., San Jose, CA (US)

( * ) Notice: Subject to any disclaimer, the term of this patent is extended or adjusted under 35 U.S.C. 154(b) by 387 days.

(21) Appl. No.: 18/126,655

(22) Filed: Mar. 27, 2023

(65) Prior Publication Data
US 2024/0329611 A1 Oct. 3, 2024

Related U.S. Application Data

(63) Continuation of application No. 18/126,061, filed on Mar. 24, 2023.

(51) Int. Cl.
*G05B 19/042* (2006.01)
*G05B 13/02* (2006.01)
*G05B 13/04* (2006.01)

(52) U.S. Cl.
CPC ....... *G05B 19/042* (2013.01); *G05B 13/0265* (2013.01); *G05B 13/047* (2013.01); *G05B 2219/2639* (2013.01)

(58) Field of Classification Search
CPC ............. G05B 19/042; G05B 13/0265; G05B 13/047; G05B 2219/2639
See application file for complete search history.

(56) References Cited

U.S. PATENT DOCUMENTS

2021/0286333 A1* 9/2021 Mukherjee ........... G05B 19/042

* cited by examiner

*Primary Examiner* — Gary Collins
(74) *Attorney, Agent, or Firm* — Kilpatrick Townsend & Stockton LLP

(57) ABSTRACT

Some examples relate to optimizing energy efficiency associated with workspaces in a building. In one specific example, a system can execute a trained machine-learning model to generate a predicted activity pattern associated with a workspace in a building, the predicted activity pattern being a forecast of workspace activity associated with the workspace over a future time window. The system can, based on the predicted activity pattern, generate at least one control signal for at least one control system associated with the workspace. And the system can transmit the at least one control signal to the at least one control system, the at least one control system being configured to receive the at least one control signal and responsively adjust at least one environmental condition associated with the workspace from a first setting to a second setting.

20 Claims, 7 Drawing Sheets

OPTIMIZING ENERGY EFFICIENCY ASSOCIATED WITH WORKSPACES IN A BUILDING

CROSS-REFERENCE TO RELATED APPLICATION

The present application is a continuation of and claims priority to U.S. patent application Ser. No. 18/126,061, filed on Mar. 24, 2023, titled "Optimizing Energy Efficiency Associated With Workspaces In A Building," the entirety of which is hereby incorporated by reference herein.

TECHNICAL FIELD

The present application generally relates to improving energy efficiency of a building and, more particularly, relates to systems and methods for optimizing energy efficiency associated with workspaces in a building.

BRIEF DESCRIPTION OF THE DRAWINGS

The accompanying drawings, which are incorporated into and constitute a part of this specification, illustrate one or more certain examples and, together with the description of the examples, serve to explain the principles and implementations of the certain examples.

DETAILED DESCRIPTION

Figure 1:
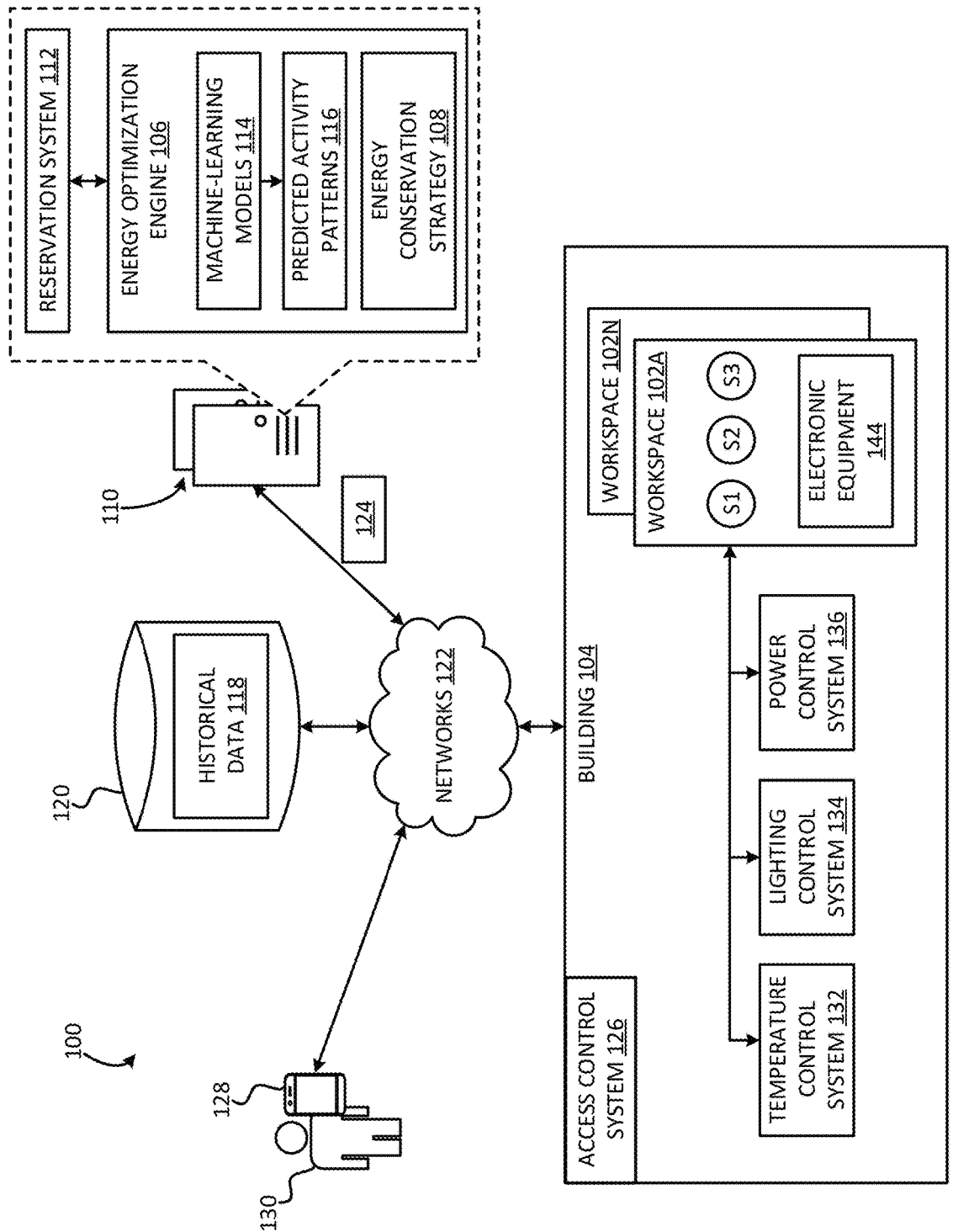
FIG. 1 shows a block diagram of an example of a system for optimizing energy efficiency associated with workspaces in a building according to some aspects of the present disclosure.

Examples are described herein in the context of systems and methods for reducing energy consumption associated with workspaces in a building. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Many workplaces have recently transitioned to a hybrid working model, in which employees may be in the office a few days a week and work remotely from home or another location the rest of the time. COVID-19 was a large contributor to this shift. Because many employers previously expected their employees to be in the office full time, their office buildings may now contain many more workspaces than are necessary given the new hybrid working model. For example, an office may contain roughly as many workspaces as there are employees, in anticipation of all employees being in the office at the same time, despite the new reality that oftentimes only a small portion of the employee population is actually in the office at any given point in time. As a result, offices may have unused workspaces that are still being heated and cooled, lit, and otherwise operated as if they contain employees, which unnecessarily consumes electrical energy.

Similar problems exist outside the office context. For example, recreational facilities (e.g., facilities with gyms, basketball courts, swimming pools, playgrounds, and/or tennis courts) previously tried to schedule their usage so that some or all of their equipment is in use at the same time. Due to COVID-19 and other concerns, some recreational facilities may now choose to stagger their scheduling so that only some of their equipment is in use at any given point in time. As a result, these recreational facilities may have unused recreational areas that are still being heated and cooled, lit, and otherwise operated as if they are in use, which unnecessarily consumes electrical energy.

Some examples of the present disclosure can overcome one or more of the abovementioned problems by providing an energy optimization engine that can determine how best to allocate available workspaces in a building among users to improve energy efficiency. A workspace is any defined space in a building designated for performing one or more activities. Examples of the building can include an office building, a recreational facility, a home, etc. Examples of the activities may include an assigned task, such as a project for a job or school; a recreational activity, such as playing a sport, playing a video game, or working out; or a combination thereof. If a user wishes to use a workspace in the building at a certain time, the energy optimization engine can identify an optimal workspace to assign to the user, from among the available workspaces that are not already in use at that time, based on an energy conservation strategy. The energy conservation strategy can be configured to optimize placement of users in the workspaces to reduce (e.g., minimize) the energy consumption of the building. For example, the energy conservation strategy may involve positioning users in relatively close proximity to one another during a given timeslot, so that less building space needs to be temperature controlled during that time slot. After identifying identify the optimal workspace to assign to the user, the energy optimization engine can notify the user of their assigned workspace.

Additionally, the energy optimization engine can automatically control the environmental conditions associated with the workspaces to improve energy efficiency. Examples of the environmental conditions associated with a workspace may include the temperature, humidity, and lighting levels associated with the workspace. For instance, the energy optimization engine can identify an inactive workspace. A workspace can be considered "active" if it is currently in use or will be in use in the near future (e.g., the next 5-10 minutes). A workspace can be considered "inactive" if it is not currently in use and will not be in use in the near future. After identifying the inactive workspace, the energy optimization engine can automatically disable temperature controls, humidity controls, and/or lighting controls associated with an inactive workspace to conserve energy. As another example, the energy optimization engine can automatically adjust the temperature level, humidity level, and/or lighting level associated with an inactive workspace to target levels. In the temperature context, one example of the target level may be an optimal level that reduces the need for additional heating or cooling of the inactive workspace by a HVAC (heating, ventilation, and air conditioning) system. The optimal level may be determined by the energy optimization engine based on one or more factors, such as the temperatures and/or humidities in other parts of the building, the temperature and/or humidity outside the building, the time of day, the time of year, etc.

If the energy optimization engine determines that a previously inactive workspace has become active, the energy optimization engine can determine the current environmental conditions in the workspace. For example, the energy optimization engine can determine the temperature, humidity, and/or lighting levels associated with the workspace. The energy optimization engine can make this determination using one or more sensors positioned proximate to the workspace. Examples of such sensors can include temperature sensors, humidity sensors, and/or ambient light sensors. If the energy optimization engine determines that one or more of the current environmental conditions associated with the workspace are at an undesirable level (e.g., a level that would be uncomfortable or impractical to an average user), the energy optimization engine may automatically adjust the one or more environmental conditions to make them more hospitable. For example, the energy optimization engine can automatically adjust the temperature, humidity, and/or lighting level associated with workspace to a more desirable level.

The energy optimization engine may also automatically control other environmental conditions associated with a workspace. For example, the energy optimization engine can control which electronic equipment associated with a workspace is active. This can be considered part of the workspace's environmental conditions. In some such examples, the energy optimization engine may automatically disable (e.g., turn off) at least some of the electronic equipment associated with an inactive workspace, to reduce energy consumption. The energy optimization engine can disable the electronic equipment by disrupting power flow to the electronic equipment. Additionally, the energy optimization engine can automatically enable at least some of the electronic equipment associated with an active workspace. The energy optimization engine can enable the electronic equipment by allowing power flow to the electronic equipment. Examples of such electronic equipment can include power outlets and switches; lighting equipment such as overhead lights or desk lamps; computers such as a desktop computers and laptop computers; cooking appliances such as microwaves and coffee machines; networking equipment such as routers and access points; temperature control equipment such as fans and space heaters; visual displays such as televisions and computer monitors; telephone equipment; fluid control systems such as pumps, valves, and plumbing fixtures; or any combination thereof. In some examples, the energy optimization engine may cause a piece of electronic equipment associated with an unused workspace to enter a low-power state (e.g., an idle state), which consumes less electrical energy than a normal operating state, rather than disabling the piece of electronic equipment altogether.

The energy optimization engine can automatically control the environmental conditions associated with the workspaces by interfacing with one or more control systems in the building. For example, the energy optimization engine can transmit control signals to a temperature control system, such as a smart HVAC system, to automatically control the temperature associated with a workspace. As another example, the energy optimization engine can transmit control signals to a lighting control system, such as a smart lighting system, to automatically control the lighting level associated with a workspace. As yet another example, the energy optimization engine can transmit control signals to a power control system, such as a smart power supply system, to automatically enable and disable electronic equipment associated with a workspace. By concurrently controlling multiple environment conditions associated with multiple workspaces throughout a building, the energy optimization engine can serve as a centralized control system that provides a more holistic energy consumption solution than may otherwise be possible.

In some examples, artificial intelligence may be employed to facilitate any of the features described herein. For example, the energy optimization engine can include one or more machine-learning models, such as neural networks, support vector machines, autoregressive integrated moving average (ARIMA) models, exponential smoothing models (ESMs), or any combination thereof. Through a training process, the machine-learning models can learn prior activity patterns associated with the workspaces in the building. For instance, the machine-learning models may be trained on historical data indicating activity patterns associated with the workspaces in a building during a prior time window. The machine-learning models can then use those learned activity patterns to generate predicted activity patterns indicating the future usage of the workspaces. The predicted activity patterns can indicate which workspaces will be active and inactive at various points in the future. Different days may have different activity patterns—for instance, a weekday may have a different activity pattern than a weekend day or a holiday. The energy optimization engine can then use the predicted activity patterns to implement one or more of the abovementioned features. For example, the energy optimization engine can determine how to assign users to workspaces in a building, based on the predicted activity patterns and the energy conservation strategy, to reduce energy consumption. As another example, the energy optimization engine can control the environmental conditions associated with the workspaces, based on the predicted activity patterns, to reduce energy consumption.

In some cases, the actual workspace activity on a given day may deviate from the predicted workspace activity for that day. In those circumstances, the energy optimization engine can automatically adjust its energy conservation plan for that day accordingly. For example, if an employee that normally works remotely on Fridays uncharacteristically decides to come into the office on a Friday, the energy optimization engine can detect this change and automatically override at least a portion of its energy conservation plan for that day accordingly. For instance, the energy optimization engine can reactivate electronic equipment associated with the employee's workspace and/or adjust a temperature level associated with the employee's workspace to a desired level, or it may assign the employee to a different workspace for the day, so as to be in close proximity to other employees in the building. The energy optimization engine can detect the changed circumstances using any suitable technique. For example, the employee may access the building using a physical authentication device (e.g., a key card or key fob), or may reserve a workspace for that day using an online reservation system, either of which can be detected by the energy optimization engine. As another example, the employee may visit the building while carrying a user device, such as a smartphone or tablet, which may transmit its geographical location in a way that is accessible to the energy optimization engine. Based on the transmitted location, the energy optimization engine can detect the employee's presence at (e.g., in or near) the building. Using any of these techniques, the energy optimization engine can detect a deviation from an expected (e.g., predicted) activity pattern and adjust the energy conservation plan as needed.

This illustrative example is given to introduce the reader to the general subject matter discussed herein and the disclosure is not limited to this example. The following sections describe various additional non-limiting examples.

FIG. 1 shows a block diagram of an example of a system 100 for optimizing energy efficiency associated with workspaces 102a-n in a building 104 according to some aspects of the present disclosure. Examples of the building 104 may include an office building, a recreational building, a school, a religious institution (e.g., a church or temple), a hotel, etc. The building 104 includes multiple distinct workspaces 102a-n in which users can perform tasks. The workspaces 102a-n may include discrete rooms, such as individual offices, business centers, or classrooms. Additionally or alternatively, the workspaces 102a-n can include designated work areas in a shared space. For instance, the workspaces 102a-n can include cubicles, desks, and/or tables in an open concept arrangement on a single floor of a building. Any suitable arrangement of the workspaces 102a-n in the building 104 is possible and, in some examples, the workspaces 102a-n may be spread across multiple floors of the building 104.

To improve the energy efficiency of the building 104, the system 100 includes an energy optimization engine 106. The energy optimization engine 106 can be deployed on a server system 110, which may include any number and combination of computing devices (e.g., servers, desktop computers, etc.). The server system 110 can be positioned in any suitable location. For example, the server system 110 may be located offsite and remote from the building 104, as shown in FIG. 1, or onsite at the building 104. The energy optimization engine 106 can help manage how users are assigned to the workspaces 102a-n, and help control the environmental conditions of the workspaces 102a-n, to improve the energy efficiency associated with the workspaces 102a-n (and thus the building 104).

More specifically, the energy optimization engine 106 can be configured to interface with a reservation system 112, through which a user 130 can reserve a workspace at a selected time (e.g., a selected date and time). The energy optimization engine 106 can be part of, or separate from, the reservation system 112. The user 130 can interact with the reservation system 112 via a user device 128, such as a smartphone, laptop computer, desktop computer, tablet, e-reader, or smartwatch. The user device 128 can communicate with the reservation system 112 via one or more networks 122, such as a local area network or the Internet.

Figure 2:
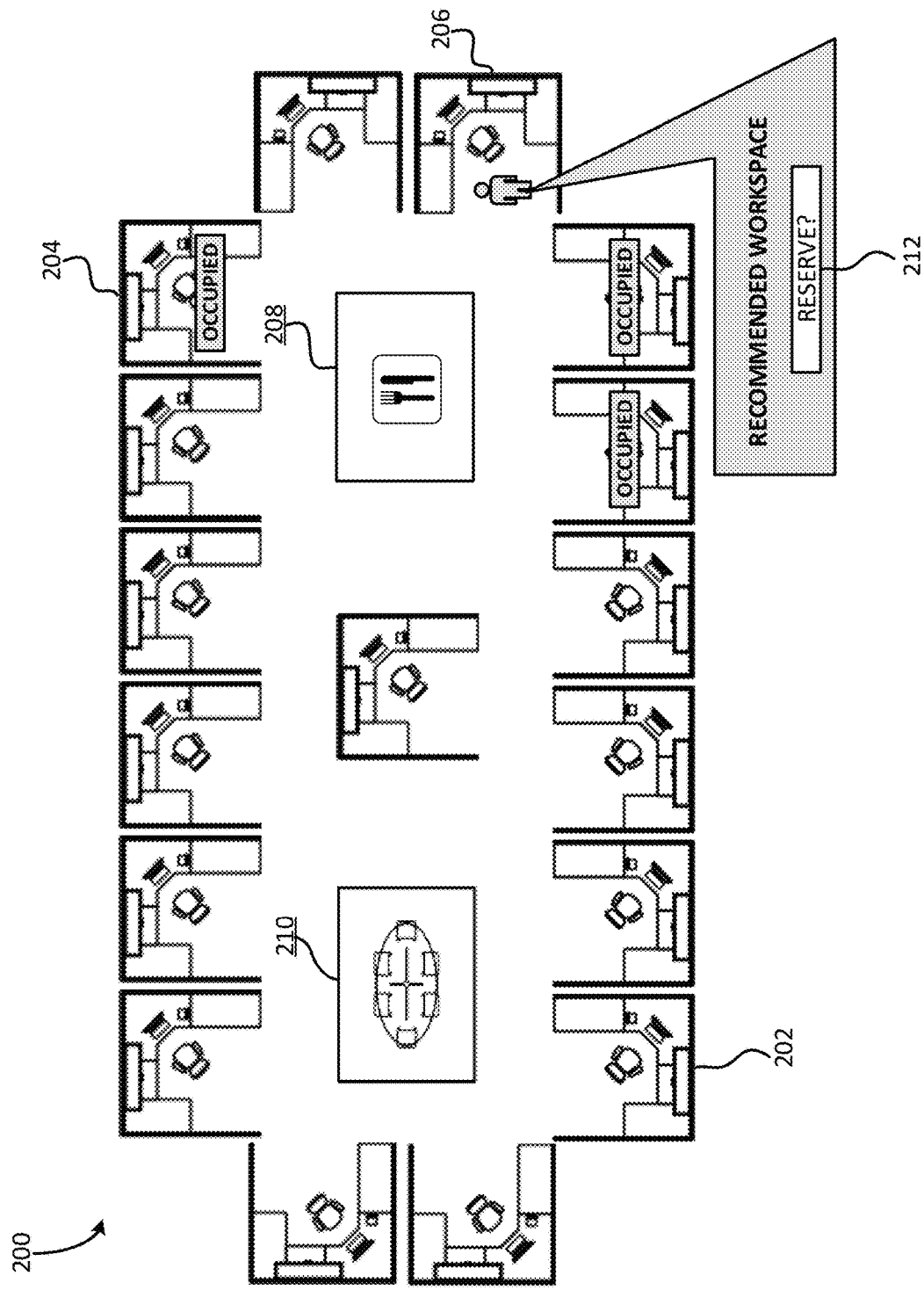
FIG. 2 shows a graphical user interface of a reservation system containing a floorplan of a building according to some aspects of the present disclosure.

The reservation system 112 can generate a graphical user interface, through which the user 130 can input a selected time at which to reserve a workspace and receive an output indicating a recommended workspace. One example of such a graphical user interface 200 is shown in FIG. 2. In this example, the graphical user interface 200 includes a floorplan view of a floor of a building. The floorplan view depicts available workspaces, such as workspace 202, at the selected time. The floorplan view also depicts occupied workspaces, such as workspace 204, at the selected time. Occupied workspaces are workspaces that are already reserved at the selected time. The occupied workspaces are designated as such in the floorplan view. In this example, the building 104 is an office building and most of the available workspaces are cubicles. Though, other types of workspaces and shared workspaces, such as a conference room 210, may also be available for reservation. Amenities, such as a breakroom 208, may also be shown in the floorplan view.

When the user 130 selects a time (e.g., date and time) at which to reserve a workspace, the reservation system 112 can interact with the energy optimization engine 106 to determine a recommended workspace 206 for the user 130. In particular, the energy optimization engine 106 can receive reservation data from the reservation system 112. The reservation data can indicate which workspaces, if any, are already reserved at the selected time. The energy optimization engine 106 can then apply an energy conservation strategy 108 to the reservation data to determine a recommended workspace 206 for the user 130. In some examples, the recommended workspace 206 may be an optimal workspace for the user 130. The optimal workspace can be whichever available workspace would reduce energy consumption the most as compared to the other available workspaces at the selected time. Alternatively, the recommended workspace 206 may be a workspace that would reduce energy consumption as compared to a baseline level, but may not necessarily be the optimal selection. After determining the recommended workspace 206 for the user 130, the energy optimization engine 106 can indicate recommended workspace 206 in the graphical user interface of the reservation system 112, for example with a notification.

The user 130 can interact with a graphical element 212 of the reservation system 112 to quickly and easily reserve the recommended workspace 206, if desired. In some examples, the reservation system 112 may restrict the user 130 to only being allowed to reserve the recommended workspace 206, to force users to adhere to the energy conservation strategy 108. In other examples, the recommended workspace 206 may be an optional recommendation, which the user 130 may choose to disregard in favor of another workspace for various reasons. For instance, the recommended workspace 206 may be an optimal workspace that the user may choose to disregard in favor of another workspace that yields good, but not necessarily optimal, energy savings.

To determine the recommended workspace 206 for the user 130 at the selected time, the energy optimization engine 106 can use the energy conservation strategy 108. Although referred to herein as a "strategy," the energy conservation strategy 108 can include one or more algorithms, sets of rules, or combinations thereof for determining how to organize users in the workspaces to reduce energy consumption. In some examples, the energy conservation strategy 108 can be configured to group users together as closely as possible, to reduce their distribution throughout the building 104. For instance, the energy conservation strategy 108 can position users at adjacent workspaces on the same floor of the building 104, so that users are as densely packed as possible on a single floor of the building 104. By densely packing users together, more users will share the same thermal (e.g., heating/cooling) zones, which can reduce the number of active thermal zones on the floor. And minimizing the amount of space in the building 104 that needs to be actively thermally controlled at the same time improves energy efficiency. Similarly, by densely packing users together in the same physical areas, more users will share the same electronic equipment (e.g., printers, networking devices, kitchen appliances, lighting units, etc.), which can reduce the amount of electronic equipment that needs to be simultaneously enabled. This, in turn, can improve energy efficiency.

Figure 3:
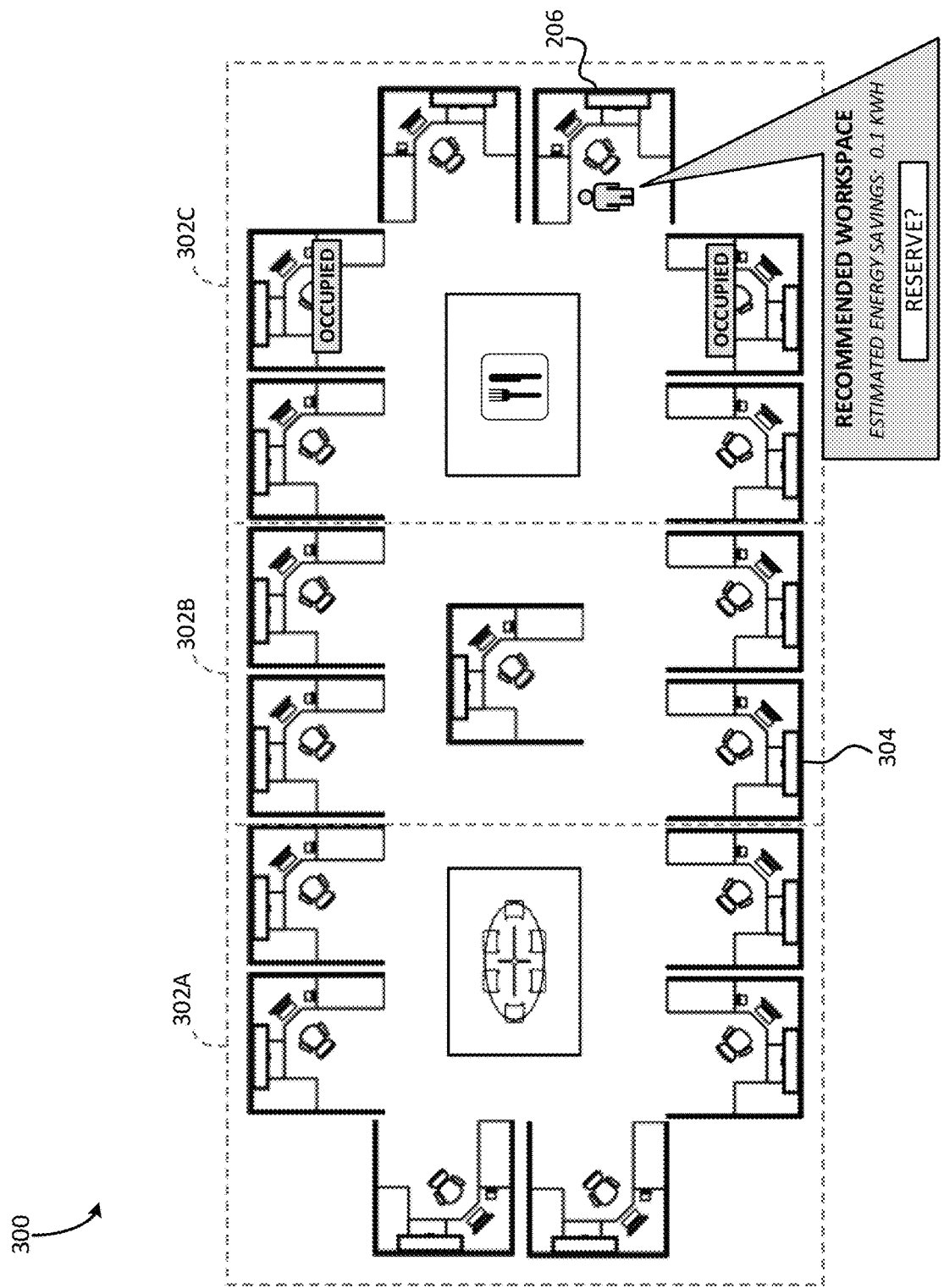
FIG. 3 shows a different zones of a building according to some aspects of the present disclosure.

One example of the above concepts is shown in FIG. 3, which depicts different zones 302a-c on a floor of the building 104. The zones 302a-c may be thermal zones, lighting zones, power zones, or any combination of these. A thermal zone can be a predefined heating and/or cooling zone. A lighting zone can be a predefined zone that shares the same lighting fixtures, such as overhead lighting fixtures or lamps. A power zone can be a predefined zone that shares the same power supply, power outlets, or power control system. Since the two occupied workspaces are in zone 302c, the energy optimization engine 106 can attempt to identify an available workspace that is also in zone 302c for the user 130. This keeps as many users in the same zone as possible at the same time. In this example, the energy optimization engine 106 has identified workspace 206 as meeting this criteria and generated an output identifying the recommended workspace 206. Assigning the user 130 to the recommended workspace 206 may result in less energy consumption than, for example, assigning the user 130 to another workspace 304 outside the zone 302c. This is because such an assignment may require a second zone 302b to be thermally controlled, or additional electronic equipment in the second zone 302b to be activated, which consumes additional energy.

In some examples, the energy optimization engine 106 can estimate the energy savings associated with choosing the recommended workspace 206 over another workspace 304 in another zone 302b. The energy optimization engine 106 can then provide the energy savings estimate to the reservation system 112, which in turn can display it to the user 130. The reservation system 112 may display the estimated energy savings in response to a triggering event, such as the user 130 interacting with either of the workspaces 206, 304 in the graphical user interface. From this information, the user 130 can make an informed decision about the energy implications associated with choosing the recommended workspace 206 over the other workspace 304.

To determine the estimated energy savings, the energy optimization engine 106 can estimate the energy consumption associated with making the other workspace 304 hospitable (e.g., comfortable and usable) to the user 130. Making the other workspace 304 hospitable for the user 130 may involve adjusting various environmental conditions associated with the other workspace 304. For example, this may involve heating/cooling the other workspace 304 to a target temperature level, humidifying the other workspace 304 to a target humidity level, enabling or waking up (e.g., from an idle state) one or more electronic devices (e.g., printers, network routers and hubs, lighting fixtures, fans, power outlets, etc.) in or near the other workspace 304, activating or controlling overhead lighting (e.g., brightening lighting from a dimmed setting) associated with the other workspace 304, or any combination of these. Each of these operations may consume energy, which can be estimated based on historical data 118 about their respective energy consumption. The current environmental conditions in the other workspace 304 may also be taken into account. For example, the energy optimization engine 106 can determine the current environmental conditions associated with the other workspace 304 based on sensor data received from one or more sensors associated with the other workspace 304. Based on the historical data 118 and/or the current environmental conditions associated with the other workspace 304, the energy optimization engine 106 can estimate the amount of additional energy that would be consumed by making the other workspace 304 hospitable for the user 130. This information can then be presented in any suitable way to the user 130, such as in the form of an energy savings estimate, an example of which is shown in FIG. 3.

Once the user 130 selects a workspace (e.g., the recommended workspace 306) to reserve at the selected time, the reservation system 112 can book the workspace for the user 130. This may involve storing the user's reservation in a schedule, for example to prevent duplicate reservations of the same workspace. Multiple users can perform the same process using the reservation system 112 to book workspaces at various times.

Referring back to FIG. 1, at any given point in time, the energy optimization engine 106 can determine whether a workspace 102a is active or inactive. In some examples, the energy optimization engine 106 can determine whether a workspace 102a is inactive by consulting the reservation schedule associated with the reservation system 112. If there is no scheduled reservation for the workspace 102a at that particular point in time, the energy optimization engine 106 can determine that the workspace 102a is inactive. Otherwise, the energy optimization engine 106 can determine that the workspace 102a is active.

Additionally, the energy optimization engine 106 may employ more sophisticated techniques to determine whether a workspace 102a is active or inactive. For example, the energy optimization engine 106 can receive geographical data indicating the geographical locations of user devices, such as user device 128, in the building 104. The user devices may generate the geographical data using sensors, such as GPS sensors, and transmit the geographical data at periodic intervals. The energy optimization engine 106 can receive and monitor the geographical data, for example to determine if any of the user devices are physically located in the workspace 102a. If so, it may indicate that the workspace 102a is active.

As another example, the energy optimization engine 106 can receive sensor signals from one or more sensors (designated S1-S3 in FIG. 1) associated with the workspace 102a. Examples of the sensors may include motion sensors, cameras, radio frequency identification (RFID) sensors, pressure sensors, temperature sensors, humidity sensors, acoustic sensors, proximity sensors, Bluetooth sensors, or any combination of these. The energy optimization engine 106 can process the sensor signals from one or more sensors to determine whether they alone, or in combination, suggest the presence of a user 130 in the workspace 102a. For example, the energy optimization engine 106 can detect the receipt of a Bluetooth beacon by sensor S1 in the workspace 102a. The energy optimization engine 106 can also detect motion in the workspace 102a by sensor S2. Based on this combination of detections, the energy optimization engine 106 can infer that the workspace 102a is likely in use.

If the energy optimization engine 106 determines that a particular workspace 102a is inactive, the energy optimization engine 106 can automatically adjust one or more of the environmental conditions associated with the workspace 102*a* in a way that reduces energy consumption. For example, the energy optimization engine 106 may disable one or more pieces of electronic equipment 144 at or near the workspace 102*a* to prevent them from consuming energy. As another example, the energy optimization engine 106 may shut off or dim the lights associated with the workspace 102*a* to reduce their energy consumption. As still another example, the energy optimization engine 106 may adjust the temperature associated with the workspace 102*a* to reduce energy consumption. In some examples, the energy optimization engine 106 may only take these steps if there are no other users that would be effected by these controls, to avoid negatively impacting other users' experiences in the building.

If the energy optimization engine 106 determines that a particular workspace 102*a* is active or is going to be active in the near future, the energy optimization engine 106 can automatically adjust one or more of the environmental conditions associated with the workspace 102*a*. For example, the energy optimization engine 106 may enable one or more pieces of electronic equipment 144 at or near the workspace 102*a*. As another example, the energy optimization engine 106 may turn off or brighten the lights associated with the workspace 102*a*. As still another example, the energy optimization engine 106 may adjust the temperature associated with the workspace 102*a* to a comfortable level.

In some examples, the energy optimization engine 106 can infer that the workspace 102*a* is active, or is going to be active in the near future, in response to detecting an event. Examples of the event may include the current time corresponding to the user's reservation time, or the current time being within a predefined timeframe (e.g., within 5 minutes) of the user's reservation time. Another example of the event may be a user interaction with an access control system 126 of the building 104. The access control system 126 may be a physical security system, such as a card reader or key fob reader, that allows or denies entry to the building 104. The user 130 may swipe their key card or key fob to attempt to access the building 104. The energy optimization engine 106 can be in communication with the access control system 126, which can transmit a communication associated with the user interaction so that the energy optimization engine 106 can detect this event. In response to detecting the event, the energy optimization engine 106 can determine which workspace 102*a* corresponds to the user's reservation and automatically adjust one or more environmental conditions associated with the workspace 102*a*.

To perform the abovementioned adjustments to the workspace 102*a*, the energy optimization engine 106 can interact with one or more control systems 132-136, which may be located onsite at the building 104. Specifically, the temperature control system 132 can be configured to adjust the temperature and/or humidity level of the workspaces 102*a*-*n*. The temperature control system 132 may include one or more HVAC units, fans, controllable baffles, and/or other temperature- or humidity-control components, and control circuitry operatively coupled to them to control their operation. The components may be in a single area in the building 104 or dispersed throughout the building 104. The energy optimization engine 106 can operate the temperature control system 132 by transmitting one or more control signals 124 to the temperature control system 132 (e.g., via the network 122). For example, the energy optimization engine 106 can transmit one or more control signals 124 to the temperature control system 132 for causing the temperature control system 132 to adjust the temperature associated with the workspace 102*a* to a target level. The target level may be an optimal level that reduces additional heating and/or cooling, and may be determined based on the conditions outside the building 104 and/or elsewhere in the building 104. The temperature control system 132 can determine when the workspace 102*a* reaches that target level based on a sensor signal from a temperature sensor (e.g., sensor S1) at the workspace 102*a*. As another example, the energy optimization engine 106 can transmit one or more control signals 124 to the temperature control system 132 for causing the temperature control system 132 to shut off temperature controls associated with the workspace 102*a*. This may allow the workspace's temperature to naturally converge to an ambient temperature.

The energy optimization engine 106 can also operate a lighting control system 134. The lighting control system 134 can be configured to adjust the lighting in the workspaces 102*a*-*n*. The lighting control system 134 may include one or more lighting components such as lighting fixtures and lamps, and control circuitry operatively coupled to the lighting components to control their operation. The lighting components may be dispersed throughout the building 104. The energy optimization engine 106 can interact with the lighting control system 134 by transmitting one or more control signals 124 to the lighting control system 134 (e.g., via the network 122). For example, the energy optimization engine 106 can transmit one or more control signals 124 to the lighting control system 134 for causing the lighting control system 134 to turn on lights associated with the workspace 102*a*. As another example, the energy optimization engine 106 can transmit one or more control signals 124 to the lighting control system 134 for causing the lighting control system 134 to adjust an ambient light level associated with the workspace 102*a* to a target level. The target level may be an optimal level that reduces electrical consumption, and may be determined based on the lighting conditions outside the building 104 and/or elsewhere in the building 104. For instance, the workspace 102*a* may include an ambient light sensor (e.g., sensor S1) that can detect the ambient light level at the workspace 102*a* and transmit the ambient light level to the energy optimization engine 106. If the ambient light at the workspace 102*a* is below a threshold level, the energy optimization engine 106 can operate the lighting control system 134 to provide only the minimum amount of additional supplemental light to the target workspace 102*a* that is required to meet or exceed the threshold level. In this way, the workspace 102*a* may be mostly illuminated by the ambient light from outside (e.g., via windows), with any deficiency in lighting cured by the lighting control system 134.

The energy optimization engine 106 can also operate a power control system 136. The power control system 136 can be configured to enable and disable electronic equipment 144 associated with the workspaces 102*a*-*n*. The power control system 136 may include one or more power control components such as switches, circuit breakers, and relays, and control circuitry operatively coupled to the power control components to control their operation. The power control components may be in a single area in the building 104 or dispersed throughout the building 104. The energy optimization engine 106 can interact with the power control system 136 by transmitting one or more control signals 124 to the lighting control system 134 (e.g., via the network 122). For example, the energy optimization engine 106 can transmit one or more control signals 124 to the power control system 136 for causing the power control system 136 to enable or wake up one or more pieces of electronic equipment 144 associated with the workspace 102a. Examples of such electronic equipment 144 can include computer towers, fax machines, telephones, printers, electrical outlets, network ports, etc.

By interacting with the control systems 132-136, the energy optimization engine 106 can adjust the environmental conditions associated with each individual workspace based on whether the workspace is currently active, going to be active soon, or inactive. The energy optimization engine 106 may also interact with other control systems (not shown for simplicity) to adjust the environmental conditions associated with the workspaces 102a-n. Inactive workspaces can have their environmental conditions adjusted so as to reduce their energy consumption, which in turn can reduce the energy consumption of the building 104.

In some examples, artificial intelligence may be employed to determine how and when to adjust the environmental conditions of the workspaces 102a-n. This may be particularly useful if the building 104 lacks a reservation system 112, though some examples may also be employed in combination with the reservation system 112. For example, the energy optimization engine 106 can include one or more machine-learning models 114, such as neural networks, support vector machines, ARIMA models, ESMs, or any combination thereof. Through a training process, the machine-learning models 114 can learn prior activity patterns associated with the workspaces 102a-n in the building 104. For instance, the machine-learning models 114 may be trained on historical data 118, which may be stored in one or more databases 120 accessible to the energy optimization engine 106 via the one or more networks 122. The historical data 118 can indicate prior activity patterns associated with the workspaces 102a-n during a prior time window, such as the prior week, month, or year. The machine-learning models 114 can then use those learned activity patterns to generate predicted activity patterns 116 for the workspaces 102a-n. Each predicted activity pattern can indicate the future usage of a corresponding workspace over a future time window, such as the next week or month. For instance, a predicted activity pattern 116 corresponding to the workspace 102a can indicate when the workspace 102 will likely be active and inactive at various points during the future time window. The energy optimization engine 106 can then use the predicted activity patterns 116 in any number of ways, some of which are described below.

As one example, the energy optimization engine 106 can determine a recommended workspace for a user 130 based on the predicted activity patterns 116. For instance, the energy optimization engine 106 determine that certain workspaces will likely be in use at a particular time based on the predicted activity patterns 116, even if those workspaces have not been actively reserved using the reservation system 112. Then, if the user 130 wants to reserve a workspace at that particular time, the energy optimization engine 106 may recommend that the user 130 be assigned to a workspace that is proximate to those other workspaces, to help reduce energy consumption in the likely event that those other workspaces are also in use at that same time.

As another example, the energy optimization engine 106 can automatically control the environmental conditions of the workspaces 102a-n based on the predicted activity patterns 116. For instance, the energy optimization engine 106 can automatically enable or disable electronic equipment 144 associated with a workspace 102a at various points throughout the day based on the predicted activity pattern 116 for the workspace 102a. Additionally or alternatively, the energy optimization engine 106 can automatically adjust the temperature and/or humidity of a zone containing one or more workspaces 102a-n based on the predicted activity patterns 116 for the one or more workspaces 102a-n. For instance, if the energy optimization engine 106 determines that all of the workspaces in a zone will be inactive at the same time, the energy optimization engine 106 can automatically turn off temperature control of the zone or adjust the temperature of the zone to a target level. These techniques may be particularly useful if the building lacks a reservation system 112 (or the reservation system 112 is not heavily used).

In some cases, the actual workspace activity on a given day may deviate from the predicted workspace activity for that day. In those circumstances, the energy optimization engine 106 can automatically adjust its energy conservation plan for that day accordingly. For example, if the user 130 does not normally work on the weekends but decides to come into the office on a Saturday to catch up on work, the energy optimization engine 106 can detect this change and automatically override at least a portion of its energy conservation plan for that day accordingly. For instance, the energy optimization engine 106 can activate electronic equipment associated with the user's assigned workspace and/or adjust a temperature level associated with the user's assigned workspace to a desired level. The energy optimization engine 106 can detect the changed circumstances using any suitable technique. For example, the user 130 may attempt to access the building 104 by interacting with the access control system 126, or may reserve a workspace 102a for that day using the reservation system 112, either of which can be detected by the energy optimization engine 106. As another example, the user 130 may visit the building 104 while carrying the user device 128, which may transmit its geographical location in a way that is accessible to the energy optimization engine 106. Based on the transmitted location, the energy optimization engine 106 can detect the employee's presence at the building 104. Using any of these techniques, the energy optimization engine 106 can detect a deviation from an expected activity pattern and adjust the energy conservation plan as needed.

Figure 4:
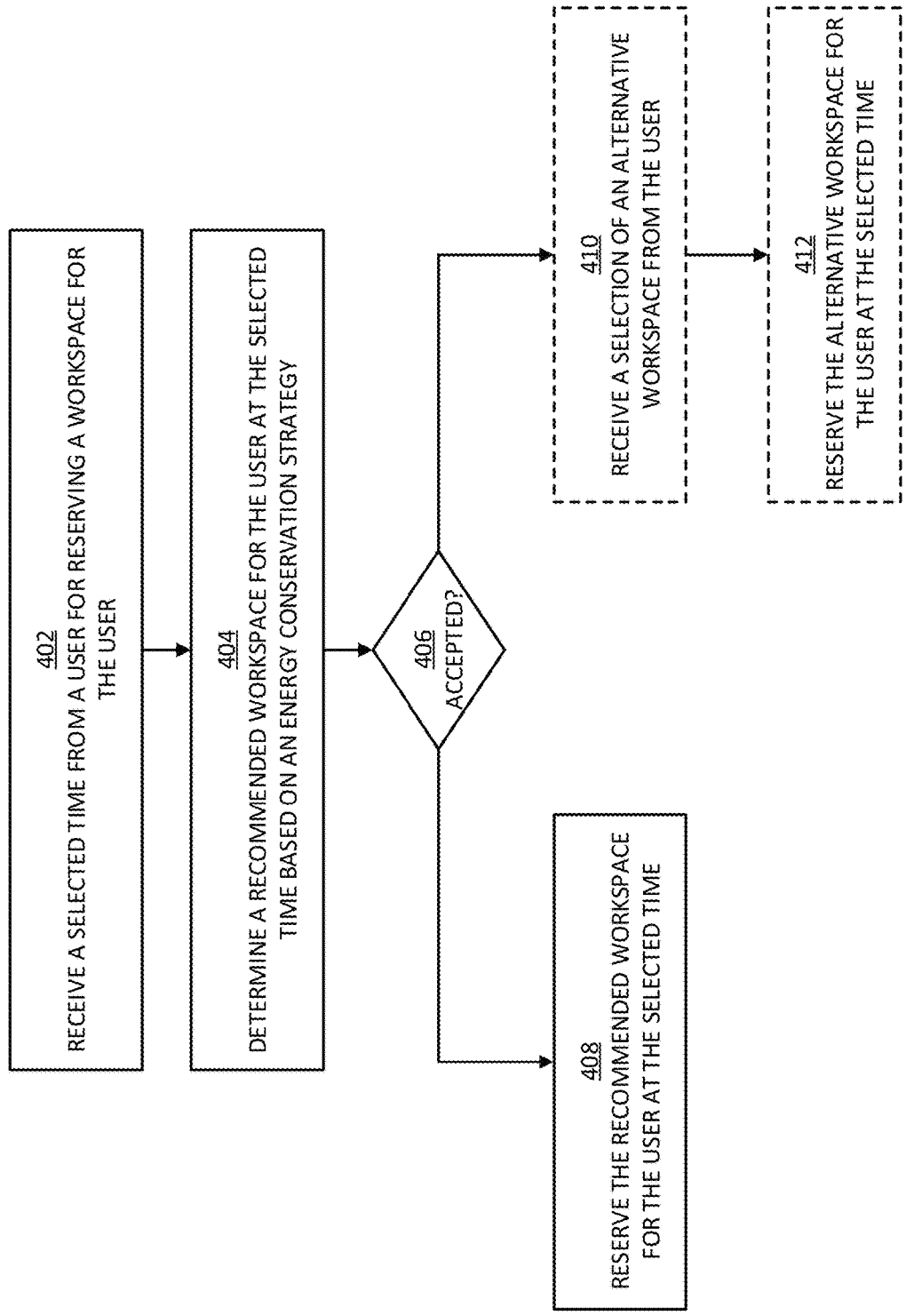
FIG. 4 shows a flowchart of an example of a process for determining and reserving a recommended workspace for a user to conserve energy, according to some aspects of the present disclosure.
Figure 5:
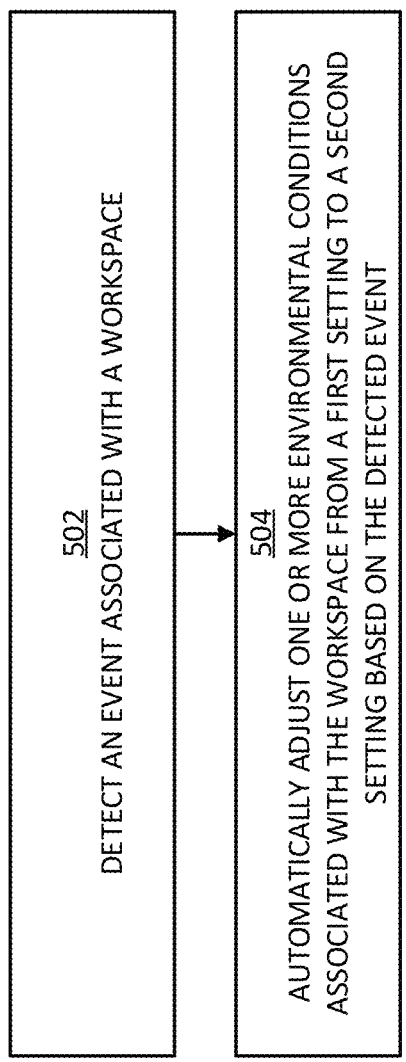
FIG. 5 shows a flowchart of an example of a process for automatically adjusting environmental conditions associated with a workspace according to some aspects of the present disclosure.
Figure 6:
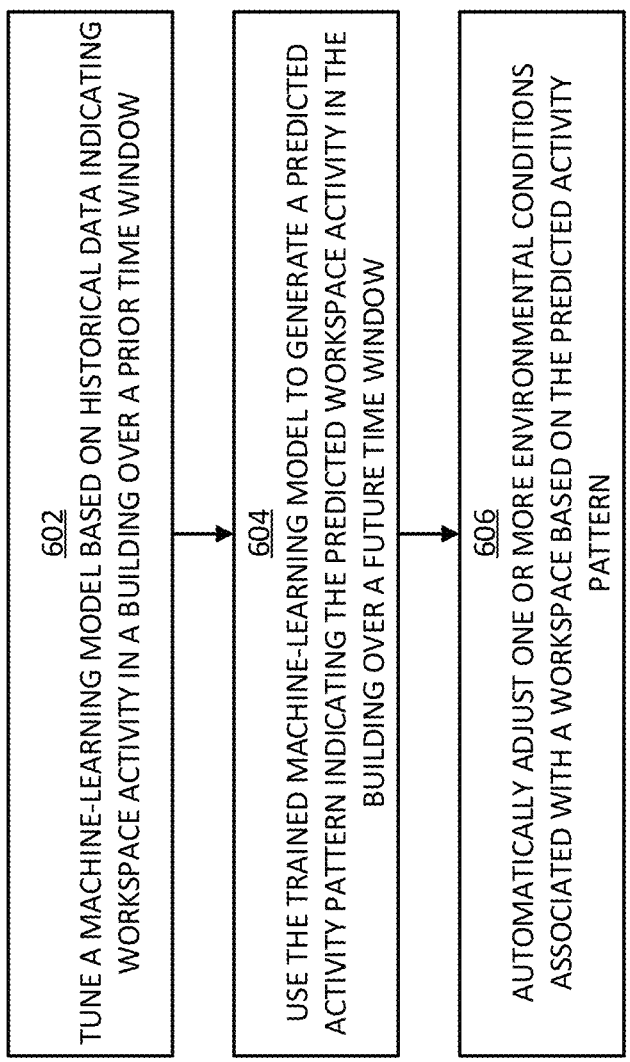
FIG. 6 shows a flowchart of an example of a process for automatically adjusting environmental conditions associated with a workspace based on predicted activity patterns according to some aspects of the present disclosure.

Turning now to FIGS. 4-6, shown are flowcharts of processes for implementing various features of the present disclosure. The processes are described below with reference to the components of FIGS. 1-3 described above. While various steps of the processes are described below as being performed by the server system 110, it will be appreciated that this may mean that the steps are performed by the reservation system 112, the energy optimization engine 106, and/or another component of the server system 110.

Referring now to FIG. 4, shown is a flowchart of an example of a process for determining and reserving a recommended workspace for a user to conserve energy, according to some aspects of the present disclosure. In step 402, a server system 110 receives a selected time from a user 130 for reserving a workspace for the user 130. The user 130 can input the selected time using any suitable mechanism, such as by interacting with a calendar object or a drop-down menu in a graphical user interface of a reservation system 112.

In step 404, the server system 110 determines a recommended workspace 206 for the user 130 at the selected time based on an energy conservation strategy 108. The energy conservation strategy 108 can include any suitable process for selecting the recommended workspace 206. Different energy conservation strategies may be available and yield different amounts of energy savings. Some energy conservation strategies may be configured to optimize energy consumption, while other energy conservation strategies may be configured to improve (but not necessarily optimize) energy consumption as compared to a baseline level. The baseline level may be, for example, an average level of energy consumption over a prior timeframe. The server system 110 may be configured by an administrator or other user to implement whichever energy conservation strategy meets their needs.

In some examples, the energy conservation strategy 108 may involve first determining which workspaces are available (e.g., not reserved) at the selected time. The available workspaces may then be analyzed to determine their proximity to reserved workspaces at the selected time. The closest available workspace to the already reserved workspaces may be selected as the recommended workspace 206. This may help to densely pack users together, which may result in energy savings. If two or more available workspaces are of roughly similar distance (e.g., equidistant) to the already reserved workspaces, one of them may be selected as the recommended workspace 206 using any suitable technique. One example of such a technique may involve selecting among the workspaces randomly. Another example of such a technique may involve selecting one of the workspaces based on one or more predefined selection criteria, as described below.

There may be any number and combination of selection criteria used in the selection process. One example of the selection criteria may be the size of the workspace. Larger workspaces may be prioritized over smaller workspaces (e.g., for comfort reasons), or smaller workspaces may be prioritized over larger workspaces (e.g., because they're easier to thermally control). Another example of the selection criteria may be how close an available workspace is to certain enabled electronic equipment, such as a printer or network router. Closer proximity to the electronic equipment may be favorable for convenience or other reasons (e.g., closer proximity to a wireless network router may result in a stronger network connection). Still another example of the selection criteria may be how close an available workspace is to certain amenities. Closer proximity to an amenity, such as a bathroom or breakroom, may be favorable for convenience or other reasons. Yet another example of the selection criteria may be the number of adjacent reserved workspaces. Since more adjacent users may result in more background noise, which may be unpleasant or distracting to the user 130, it may be preferable to select whichever workspace has the fewest adjacent reserved workspaces as the recommended workspace 206. Some or all of these selection criteria may be taken into account by the server system 110 in determining the recommended workspace 206 for the user 130 at the selected time.

In step 406, the server system 110 determines whether the recommended workspace 206 was approved or rejected by the user 130, though in other examples it may not be possible for the user 130 to reject the recommendation. The user 130 may signify their approval or rejection by interacting with the graphical user interface of the reservation system 112 using their user device 128. If the recommended workspace 206 was approved, the process can continue to block 408, where the server system 110 reserves the recommended workspace 206 for the user 130 at the selected time. If the recommended workspace 206 was rejected, the server system 110 may optionally perform steps 410-412.

In step 410, the server system 110 receives a selection of an alternative workspace (e.g., workspace 202 of FIG. 2) from the user 130. The user 130 may make the alternative selection by interacting with the graphical user interface of the reservation system 112 using their user device 128.

In step 412, the server system 110 reserves the alternative workspace for the user 130 at the selected time.

Referring now to FIG. 5, shown is a flowchart of an example of a process for automatically adjusting environmental conditions associated with a workspace in response to a detected event according to some aspects of the present disclosure.

In block 502, the server system 110 detects an event associated with a workspace 102a. Examples of the event may include the current time corresponding to a reservation time associated with the workspace 102a, the current time being within a predefined timeframe of the reservation time, the workspace 102a becoming active, the workspace 102a becoming inactive, etc. As noted earlier, in some examples the server system 110 may determine that a workspace 102a is active or inactive based on sensor signals from one or more sensors S1-S3 associated with the workspace 102a. Additionally or alternatively, the server system 110 may determine (e.g., infer) that the workspace 102a is active if the current time corresponds to a reservation window. Similarly, the server system 110 may determine that the workspace 102a is inactive if the current time is outside the reservation window.

In some examples, the server system 110 can detect an event involving a user 130 arriving for their reservation earlier than expected. For example, the user 130 may reserve the workspace 102a for a particular start time on a selected day. But prior to the start time on the selected day, the server system 110 may detect the user 130 interacting with the access control system 126 to enter the building 104 (e.g., because the user 130 arrived early). So, the server system 110 may infer that the user 130 arrived for their reservation early.

In block 504, the server system 110 automatically adjusts one or more environmental conditions associated with the workspace 102a from a first setting to a second setting, based on the detected event. The server system 110 can adjust the one or more environmental conditions so that they reach the second setting by the selected time or within a predefined timeframe (e.g., 5-10 minutes) after the selected time. To do so, the server system 110 can transmit one or more control signals 124 to one or more control systems 132-136, which can responsively modify the one or more environmental conditions from their respective first settings to respective second settings. For example, the server system 110 can transmit a first control signal to a temperature control system 132 to adjust a temperature at the workspace 102a from a current temperature to a target temperature, a second control signal to a lighting control system 134 to adjust an ambient light level at the workspace 102a from a current lighting level to a target lighting level, and a third control signal to a power control system 136 to set electronic equipment at the workspace 102a from a current setting to a target setting (e.g., from a disabled setting to an enabled setting). In the above example, the current settings can serve as the first setting and the target settings can serve as the second setting. Feedback from the sensors S1-S3 associated with the workspace 102a can be used to monitor the workspace's environmental conditions and to create a control loop, which can help ensure the environmental conditions reach the target settings.

Each control signal may include control data generated by the server system 110. The control data may indicate the second setting (e.g., target setting) for an environmental condition associated with the workspace 102a. In some examples, the second setting may be a default setting or a user customizable setting. The default setting can be selected by an administrator and may be common among some or all workspaces 102a-n. In contrast, the user customizable setting may be selected by the user 130 based on the user's preferences. For instance, the user 130 may input their desired target temperature, desired lighting level, and/or desired list of electronic equipment to enable. The user 130 can input their desired settings via the reservation system 112, for example when they make the reservation or at another time.

As noted above, the control data may indicate the second setting for an environmental condition associated with the workspace 102a. In some examples, the second setting can be a dynamically determined setting configured for conserving energy. The dynamically determined setting can be determined by the server system 110 using one or more rules and/or algorithms, which can be configured to reduce energy consumption associated with the workspace 102a. For example, the server system 110 may dynamically compute the target temperature or the target lighting level based on the rules or algorithms. The rules and algorithms may take into account various factors in determining a value for the dynamically determined setting. Examples of such factors can include whether the workspace 102a is active or inactive; the environmental conditions outside the building; the environmental conditions associated with other (e.g., adjacent) workspaces; predicted activity patterns 116 associated with the workspace 102a and/or other workspaces; or any combination of these.

In some examples, it may take a non-trivial amount of time to adjust an environmental condition from the first setting to the second setting. For instance, it may take several minutes to adjust the temperature associated with the workspace 102a from a current temperature to a target temperature. So, the server system 110 may automatically initiate the adjustment process prior to the start of the user's reservation, so that the environmental condition reaches the second setting by the time the user's reservation begins or shortly thereafter (e.g., within 5 minutes of the start of the reservation). The length of time required to complete the adjustment process, and a start time at which to initiate the adjustment process, may be estimated based on prior historical data 118. For example, the system 100 can track the amount of time that it took to complete various adjustment processes for various environmental conditions during a prior time window and store that data as part of the historical data 118. That data can be tracked using feedback from the sensors S1-S3 and the control systems 132-136. The server system 110 can then analyze that data, for example using a model such as machine-learning model 114, to estimate the amount of time it would take to complete a similar adjustment process in the future. Based on the estimated amount of time, the server system 110 can work backwards from a reservation time to determine a start time for initiating an adjustment process for a corresponding environmental condition. The server system 110 can then interact with the appropriate control system(s) to initiate the adjustment process at the start time.

Referring now to FIG. 6, shown is a flowchart of an example of a process for automatically adjusting environmental conditions associated with a workspace based on predicted activity patterns according to some aspects of the present disclosure.

In block 602, the server system 110 tunes (e.g., trains) a machine-learning model 114 based on historical data 118 indicating workspace activity in a building 104 over a prior time window. For example, the server system 110 can obtain (e.g., receive or generate) the historical data 118. The historical data 118 may be generated by tracking the workspace activity in the building 104 during the prior time window. The workspace activity may be tracked using reservation data from the reservation system 112, sensor data from the sensors S1-S3 associated with the workspaces 102a-n, access control data generated by the access control system 126 as users enter and leave the building 104, and/or other data sources. The generated historical data 118 may be time series data indicating usage of the workspaces 102a-n at various points throughout the day, for each day over the prior time window. Usage of common areas and amenities (e.g., breakrooms and bathrooms) may also be tracked and included in the historical data 118. After receiving the historical data 118, the server system 110 can perform a tuning process (e.g., training process) to tune the machine-learning model 114 based on the historical data 118. The tuning process may be a supervised learning process that relies on the historical data 118 in learning relationships between inputs and outputs. The tuning process may involve thousands or millions of iterations, during which weights or other parameters associated with the machine-learning model are repeatedly adjusted until a suitable level of accuracy is reached.

In block 604, the server system 110 uses the trained machine-learning model 114 to generate a predicted activity pattern 116. The predicted activity pattern 116 can be a forecast of the predicted activity associated with one or more workspaces 102a-n and/or common areas over a future time window. For instance, the predicted activity pattern 116 can indicate when each workspace 102a-n will likely be active and inactive during the future time window. The predicted activity pattern 116 may also indicate when each common area will likely be active and inactive during the future time window. Using the predicted activity pattern 116, the server system 110 can develop an energy conservation plan configured to reduce energy consumption for each day during the future time window. In developing the energy conservation plan, the server system 110 may also take into account the reservation data indicating the workspace reservations each day. Of course, if the actual workspace activity for a given day deviates from what is expected, the energy conservation plan for a given day may be overridden or adjusted accordingly, as described above.

In block 606, the server system 110 automatically adjusts one or more environmental conditions associated with a workspace 102a from a first setting to a second setting, based on the predicted activity pattern 116. For example, the server system 110 can develop an energy conservation plan for a given day based on the predicted activity pattern 116 and optionally reservation data, as described above. After generating the energy conservation plan, the server system 110 can automatically adjust the one or more environmental conditions as specified in the energy conservation plan on that day. This may involve automatically adjusting the one or more environmental conditions associated with the workspace 102a to multiple different settings over the course of the day based on the energy conservation plan.

As one specific example, the server system 110 can use the predicted activity pattern 116 to determine that the workspace 102a will likely be inactive during a first time window on a particular day. So, the server system 110 can transmit first control signals 124 to the control systems 132-136. Based on the first control signals 124, the control systems 132-136 can cause the one or more environmental conditions associated with the workspace 102a to be set to a first group of target settings during the first time window. The first group of target settings may be configured to conserve energy. Additionally, the server system 110 can use the predicted activity pattern 116 to determine that the workspace 102a will likely be active during a second time window on that particular day. So, the server system 110 can transmit second control signals 124 to the control systems 132-136. Based on the second control signals 124, the control systems 132-136 can cause the one or more environmental conditions associated with the workspace 102a to be set to a second group of target settings during the second time window. The second group of target settings can be determined using any of the techniques described above. For example, the second group of target settings may include default settings, user customizable settings, and/or dynamically determined settings for conserving energy. The server system 110 can repeat this process multiple times throughout the day, to dynamically adjust the one or more environmental conditions associated with the workspace 102a based on the corresponding predicted activity pattern.

As noted above, the control signals 124 can include control data that may indicate the second setting for an environmental condition associated with the workspace 102a. The second setting can be a default setting, a user customizable setting, or a dynamically determined setting configured for conserving energy. The dynamically determined setting can be determined by the server system 110 using any of the techniques described previously.

In some examples, it may take a non-trivial amount of time to adjust an environmental condition from the first setting to the second setting. For instance, it may take several minutes to adjust the temperature associated with the workspace 102a from a current temperature to a target temperature. So, the server system 110 may automatically initiate the adjustment process prior to a target time (e.g., determined based on the predicted activity pattern 116), so that the environmental condition reaches the second setting by the target time or shortly thereafter. The length of time required to complete the adjustment process, and a start time at which to initiate the adjustment process, may be estimated based on prior historical data 118, as described above.

Figure 7:
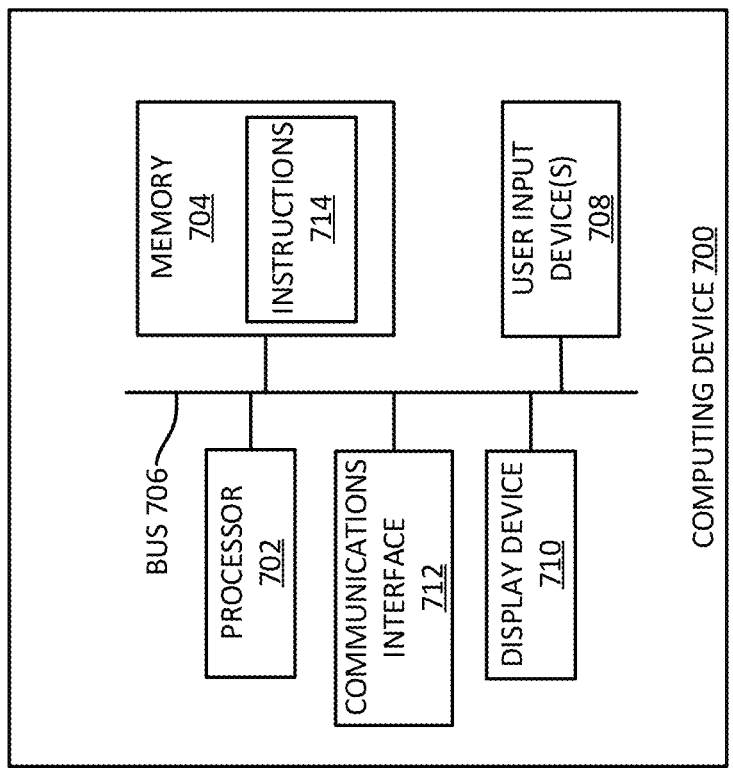
FIG. 7 shows a block diagram of an example of a computing device usable to implement some aspects of the present disclosure.

FIG. 7 is a block diagram of an example of a computing device 700 usable to implement some aspects of the present disclosure. In some examples, the computing device 700 may correspond to the server system 110, the user device 128, or any of the control systems 132-136 described above.

The computing device 700 includes a processor 702 that is in communication with the memory 704 and other components of the computing device 700 using one or more communications buses 706. The processor 702 is configured to execute processor-executable instructions 714 stored in the memory 704 to perform one or more processes described herein. In some examples, the instructions 714 can form part of energy optimization engine 106, which can implement some or all of the processes described above.

As shown, the computing device 700 also includes one or more user input devices 708 (e.g., a keyboard, mouse, touchscreen, video capture device, and/or microphone) to accept user input and the display device 710 to provide visual output to a user. The computing device 700 further includes a communications interface 712. In some examples, the communications interface 712 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a videoconferencing server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

Certain aspects and features can be implemented according to one or more of the following examples. As used below, any reference to a series of examples is to be understood as reference to each of those examples disjunctively (E.g., "Examples 1-4" is to be understood as Examples 1, 2, 3, or 4").

Example #1: A non-transitory computer-readable medium comprising program code that is executable by one or more processors to cause the one or more processors to: receive a selected time from a user for reserving a workspace in a building; determine a recommended workspace for the user at the selected time based on an energy efficiency strategy; and transmit at least one control signal to at least one control system associated with the recommended workspace, the at least one control system being configured to receive the at least one control signal and responsively adjust at least one environmental condition associated with the recommended workspace from a first setting to a second setting, wherein the at least one control system is configured to adjust the at least one environmental condition from the first setting to the second setting by the selected time or within a predefined timeframe after the selected time.

Example #2: The non-transitory computer-readable medium of Example #1, wherein the energy efficiency strategy involves positioning users at adjacent workspaces in the building, the recommended workspace being selected based on its adjacency to another workspace that is reserved at the selected time.

Example #3: The non-transitory computer-readable medium of any of Examples #1-2, wherein the at least one environmental condition includes a temperature level, a humidity level, and a lighting level associated with the recommended workspace.

Example #4: The non-transitory computer-readable medium of any of Examples #1-3, wherein the at least one environmental condition includes whether a piece of electronic equipment associated with the recommended workspace is enabled or disabled, wherein the first setting involves the piece of electronic equipment being disabled, and wherein the second setting involves the piece of electronic equipment being enabled.

Example #5: The non-transitory computer-readable medium of any of Examples #1-4, further comprising program code that is executable by the one or more processors to cause the one or more processors to: determine that the recommended workspace is inactive; and transmit at least one other control signal to the at least one control system in response to determining that the recommended workspace is inactive, the at least one control system being configured to receive the at least one other control signal and responsively adjust the at least one environmental condition to the first setting.

Example #6: The non-transitory computer-readable medium of any of Examples #1-5, further comprising program code that is executable by the one or more processors to cause the one or more processors to: receive a sensor signal from a sensor associated with the recommended workspace; and determine that the recommended workspace is inactive based on the sensor signal.

Example #7: The non-transitory computer-readable medium of any of Examples #1-6, further comprising program code that is executable by the one or more processors to cause the one or more processors to: determine the second setting based on one or more environmental conditions outside the recommended workspace; and generate the at least one control signal to indicate the second setting.

Example #8: The non-transitory computer-readable medium of any of Examples #1-7, wherein the predefined timeframe is 10 minutes.

Example #9: The non-transitory computer-readable medium of any of Examples #1-8, further comprising program code that is executable by the one or more processors to cause the one or more processors to: detect an event associated with the recommended workspace; and transmit the at least one control signal in response to detecting the event.

Example #10: A method comprising: receiving, by one or more processors, a selected time from a user for reserving a workspace in a building; determining, by the one or more processors, a recommended workspace for the user at the selected time based on an energy efficiency strategy; and transmitting, by the one or more processors, at least one control signal to at least one control system associated with the recommended workspace, the at least one control system being configured to receive the at least one control signal and responsively adjust at least one environmental condition associated with the recommended workspace from a first setting to a second setting, wherein the at least one control system is configured to adjust the at least one environmental condition from the first setting to the second setting by the selected time or within a predefined timeframe after the selected time.

Example #11: The method of Example #10, wherein the energy efficiency strategy involves positioning users at adjacent workspaces in the building, the recommended workspace being selected based on its adjacency to another workspace that is reserved at the selected time.

Example #12: The method of any of Examples #10-11, wherein the at least one environmental condition includes a temperature level, a humidity level, or a lighting level associated with the recommended workspace.

Example #13: The method of any of Examples #10-12, wherein the at least one environmental condition includes whether a piece of electronic equipment associated with the recommended workspace is enabled or disabled, wherein the first setting involves the piece of electronic equipment being disabled, and wherein the second setting involves the piece of electronic equipment being enabled.

Example #14: The method of any of Examples #10-13, further comprising: determining that the recommended workspace is inactive; and transmitting at least one other control signal to the at least one control system in response to determining that the recommended workspace is inactive, the at least one control system being configured to receive the at least one other control signal and responsively adjust the at least one environmental condition to the first setting.

Example #15: The method of any of Examples #10-14, further comprising: receiving a sensor signal from a sensor associated with the recommended workspace; and determining that the recommended workspace is inactive based on the sensor signal.

Example #16: The method of any of Examples #10-15, further comprising: determining the second setting based on one or more environmental conditions outside the recommended workspace; and generating the at least one control signal to indicate the second setting.

Example #17: The method of any of Examples #10-16, wherein the predefined timeframe is 10 minutes.

Example #18: The method of any of Examples #10-17, further comprising: detecting an event associated with the recommended workspace; and transmitting the at least one control signal in response to detecting the event.

Example #19: A system comprising: one or more processors; and one or more memories including instructions that are executable by the one or more processors to cause the one or more processors to: receive a selected time from a user for reserving a workspace in a building; determine a recommended workspace for the user at the selected time based on an energy efficiency strategy; and transmit at least one control signal to at least one control system associated with the recommended workspace, the at least one control system being configured to receive the at least one control signal and responsively adjust at least one environmental condition associated with the recommended workspace from a first setting to a second setting, wherein the at least one control system is configured to adjust the at least one environmental condition from the first setting to the second setting by the selected time or within a predefined timeframe after the selected time.

Example #20: The system of Example #19, wherein the energy efficiency strategy involves positioning users at adjacent workspaces in the building, the recommended workspace being selected based on its adjacency to another workspace that is reserved at the selected time.

Example #21: A non-transitory computer-readable medium comprising program code that is executable by one or more processors to cause the one or more processors to: execute a trained machine-learning model to generate a predicted activity pattern associated with a workspace in a building, the predicted activity pattern being a forecast of workspace activity associated with the workspace over a future time window; based on the predicted activity pattern, generate at least one control signal for at least one control system associated with the workspace; and transmit the at least one control signal to the at least one control system, the at least one control system being configured to receive the at least one control signal and responsively adjust at least one environmental condition associated with the workspace from a first setting to a second setting.

Example #22: The non-transitory computer-readable medium of Example #21, further comprising program code that is executable by the one or more processors to cause the one or more processors to: obtain historical data indicating prior workspace activity associated with the workspace over a prior time window; and generate the trained machine-learning model by training a machine-learning model based on the historical data.

Example #23: The non-transitory computer-readable medium of any of Examples #21-22, wherein the at least one control system is configured to initiate adjustment of the at least one environmental condition from the first setting to the second setting at a particular time, and further comprising program code that is executable by the one or more processors to cause the one or more processors to: determine the particular time based on the predicted activity pattern or a reservation associated with the workspace.

Example #24: The non-transitory computer-readable medium of Example #23, further comprising program code that is executable by the one or more processors to cause the one or more processors to: determine an estimated length of time required to adjust the at least one environmental condition from the first setting to the second setting based on historical data; and determine the particular time based on the estimated length of time.

Example #25: The non-transitory computer-readable medium of Example #24, further comprising program code that is executable by the one or more processors to cause the one or more processors to: determine the estimated length of time by applying a model to the historical data.

Example #26: The non-transitory computer-readable medium of any of Examples #21-25, further comprising program code that is executable by the one or more processors to cause the one or more processors to: generate an energy conservation plan for a particular day based on the predicted activity pattern associated with the workspace for that particular day; and automatically adjust the at least one environmental condition associated with the workspace to multiple different settings throughout the particular day based on the energy conservation plan.

Example #27: The non-transitory computer-readable medium of any of Examples #21-26, wherein the at least one environmental condition includes whether a piece of electronic equipment associated with the workspace is enabled or disabled, wherein the first setting involves the piece of electronic equipment being disabled, and wherein the second setting involves the piece of electronic equipment being enabled.

Example #28: The non-transitory computer-readable medium of any of Examples #21-27, wherein the at least one environmental condition includes a temperature level, a humidity level, and a lighting level associated with the workspace.

Example #29: A method comprising: executing, by one or more processors, a trained machine-learning model to generate a predicted activity pattern associated with a workspace in a building, the predicted activity pattern being a forecast of workspace activity associated with the workspace over a future time window; based on the predicted activity pattern, generating, by the one or more processors, at least one control signal for at least one control system associated with the workspace; and transmitting, by the one or more processors, the at least one control signal to the at least one control system, the at least one control system being configured to receive the at least one control signal and responsively adjust at least one environmental condition associated with the workspace from a first setting to a second setting.

Example #30: The method of Example #29, further comprising: obtaining historical data indicating prior workspace activity associated with the workspace over a prior time window; and generating the trained machine-learning model by training a machine-learning model based on the historical data.

Example #31: The method of any of Examples #29-30, wherein the at least one control system is configured to initiate adjustment of the at least one environmental condition from the first setting to the second setting at a particular time, and further comprising: determining the particular time based on the predicted activity pattern or a reservation associated with the workspace.

Example #32: The method of Example #31, further comprising: determining an estimated length of time required to adjust the at least one environmental condition from the first setting to the second setting based on historical data; and determining the particular time based on the estimated length of time.

Example #33: The method of Example #32, further comprising: determining the estimated length of time by applying a model to the historical data.

Example #34: The method of any of Examples #29-33, further comprising: generating an energy conservation plan for a particular day based on the predicted activity pattern associated with the workspace for that particular day; and automatically adjusting the at least one environmental condition associated with the workspace to multiple different settings throughout the particular day based on the energy conservation plan.

Example #35: The method of any of Examples #29-34, wherein the at least one environmental condition includes whether a piece of electronic equipment associated with the workspace is enabled or disabled, wherein the first setting involves the piece of electronic equipment being disabled, and wherein the second setting involves the piece of electronic equipment being enabled.

Example #36: The method of any of Examples #29-35, wherein the at least one environmental condition includes a temperature level, a humidity level, and a lighting level associated with the workspace.

Example #37: A system comprising: one or more processors; and one or more memories including instructions that are executable by the one or more processors to cause the one or more processors to: execute a trained machine-learning model to generate a predicted activity pattern associated with a workspace in a building, the predicted activity pattern being a forecast of workspace activity associated with the workspace over a future time window; based on the predicted activity pattern, generate at least one control signal for at least one control system associated with the workspace; and transmit the at least one control signal to the at least one control system, the at least one control system being configured to receive the at least one control signal and responsively adjust at least one environmental condition associated with the workspace from a first setting to a second setting.

Example #38: The system of Example #37, wherein the one or more memories further include instructions that are executable by the one or more processors to cause the one or more processors to: obtain historical data indicating prior workspace activity associated with the workspace over a prior time window; and generate the trained machine-learning model by training a machine-learning model based on the historical data.

Example #39: The system of any of Examples #37-38, wherein the at least one control system is configured to initiate adjustment of the at least one environmental condition from the first setting to the second setting at a particular time, and wherein the one or more memories further include instructions that are executable by the one or more processors to cause the one or more processors to: determine the particular time based on the predicted activity pattern or a reservation associated with the workspace.

Example #40: The system of Example #39, wherein the one or more memories further include instructions that are executable by the one or more processors to cause the one or more processors to: determine an estimated length of time required to adjust the at least one environmental condition from the first setting to the second setting based on historical data; and determine the particular time based on the estimated length of time.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations thereof in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

The invention claimed is:

1. A non-transitory computer-readable medium comprising program code that is executable by one or more processors to cause the one or more processors to:
    execute a trained machine-learning model to generate a predicted activity pattern associated with a target workspace in a building, the predicted activity pattern being a forecast of workspace activity associated with the target workspace over a future time window, wherein the trained machine-learning model is a machine-learning model that was previously trained based on historical data indicating prior workspace activity associated with the target workspace over a prior time window, wherein the prior workspace activity includes prior reservations for the target workspace made by one or more users;
    based on the predicted activity pattern, generate at least one control signal for at least one control system associated with the target workspace; and
    transmit the at least one control signal to the at least one control system, the at least one control system being configured to receive the at least one control signal and responsively adjust at least one environmental condition associated with the target workspace from a first setting to a second setting.

2. The non-transitory computer-readable medium of claim 1, wherein the at least one control system is configured to initiate adjustment of the at least one environmental condition from the first setting to the second setting at a particular time, and further comprising program code that is executable by the one or more processors to cause the one or more processors to:
    determine the particular time based on the predicted activity pattern or a reservation associated with the target workspace.

3. The non-transitory computer-readable medium of claim 2, further comprising program code that is executable by the one or more processors to cause the one or more processors to:
    determine an estimated length of time required to adjust the at least one environmental condition from the first setting to the second setting based on historical data; and
    determine the particular time based on the estimated length of time.

4. The non-transitory computer-readable medium of claim 3, further comprising program code that is executable by the one or more processors to cause the one or more processors to:
    determine the estimated length of time by applying a model to the historical data.

5. The non-transitory computer-readable medium of claim 1, further comprising program code that is executable by the one or more processors to cause the one or more processors to:
    generate an energy conservation plan for a particular day based on the predicted activity pattern associated with the target workspace for that particular day; and
    automatically adjust the at least one environmental condition associated with the target workspace to multiple different settings throughout the particular day based on the energy conservation plan.

6. The non-transitory computer-readable medium of claim 1, wherein the at least one environmental condition includes whether a piece of electronic equipment associated with the target workspace is enabled or disabled, wherein the first setting involves the piece of electronic equipment being disabled, and wherein the second setting involves the piece of electronic equipment being enabled.

7. The non-transitory computer-readable medium of claim 1, wherein the at least one environmental condition includes a temperature level, a humidity level, and a lighting level associated with the target workspace.

8. The non-transitory computer-readable medium of claim 1, wherein the prior workspace activity is derived from sensor data acquired from one or more sensors that are inside the building and outside the target workspace.

9. The non-transitory computer-readable medium of claim 1, wherein the prior workspace activity is derived from sensor data acquired from one or more sensors coupled to the target workspace.

10. The non-transitory computer-readable medium of claim 1, wherein the at least one control signal is generated based on an environmental condition inside the building.

11. A method comprising:
executing, by one or more processors, a trained machine-learning model to generate a predicted activity pattern associated with a target workspace in a building, the predicted activity pattern being a forecast of workspace activity associated with the target workspace over a future time window, wherein the trained machine-learning model is a machine-learning model that was previously trained based on historical data indicating prior workspace activity associated with the target workspace over a prior time window, wherein the prior workspace activity includes prior reservations for the target workspace made by one or more users;
based on the predicted activity pattern, generating, by the one or more processors, at least one control signal for at least one control system associated with the target workspace; and
transmitting, by the one or more processors, the at least one control signal to the at least one control system, the at least one control system being configured to receive the at least one control signal and responsively adjust at least one environmental condition associated with the target workspace from a first setting to a second setting.

12. The method of claim 11, wherein the at least one control system is configured to initiate adjustment of the at least one environmental condition from the first setting to the second setting at a particular time, and further comprising:
determining the particular time based on the predicted activity pattern or a reservation associated with the target workspace.

13. The method of claim 12, further comprising:
determining an estimated length of time required to adjust the at least one environmental condition from the first setting to the second setting based on historical data; and
determining the particular time based on the estimated length of time.

14. The method of claim 13, further comprising:
determining the estimated length of time by applying a model to the historical data.

15. The method of claim 11, further comprising:
generating an energy conservation plan for a particular day based on the predicted activity pattern associated with the target workspace for that particular day; and
automatically adjusting the at least one environmental condition associated with the target workspace to multiple different settings throughout the particular day based on the energy conservation plan.

16. The method of claim 11, wherein the at least one environmental condition includes whether a piece of electronic equipment associated with the target workspace is enabled or disabled, wherein the first setting involves the piece of electronic equipment being disabled, and wherein the second setting involves the piece of electronic equipment being enabled.

17. The method of claim 11, wherein the at least one environmental condition includes a temperature level, a humidity level, and a lighting level associated with the target workspace.

18. A system comprising:
one or more processors; and
one or more memories including instructions that are executable by the one or more processors to cause the one or more processors to:
execute a trained machine-learning model to generate a predicted activity pattern associated with a target workspace in a building, the predicted activity pattern being a forecast of workspace activity associated with the target workspace over a future time window, wherein the trained machine-learning model is a machine-learning model that was previously trained based on historical data indicating prior workspace activity associated with the target workspace over a prior time window, wherein the prior workspace activity includes prior reservations for the target workspace made by one or more users;
based on the predicted activity pattern, generate at least one control signal for at least one control system associated with the target workspace; and
transmit the at least one control signal to the at least one control system, the at least one control system being configured to receive the at least one control signal and responsively adjust at least one environmental condition associated with the target workspace from a first setting to a second setting.

19. The system of claim 18, wherein the at least one control system is configured to initiate adjustment of the at least one environmental condition from the first setting to the second setting at a particular time, and wherein the one or more memories further include instructions that are executable by the one or more processors to cause the one or more processors to:
determine the particular time based on the predicted activity pattern or a reservation associated with the target workspace.

20. The system of claim 19, wherein the one or more memories further include instructions that are executable by the one or more processors to cause the one or more processors to:
determine an estimated length of time required to adjust the at least one environmental condition from the first setting to the second setting based on historical data; and
determine the particular time based on the estimated length of time.

* * * * *